United States Patent [19]

Chiappa

[11] Patent Number: 5,249,292
[45] Date of Patent: Sep. 28, 1993

[54] DATA PACKET SWITCH USING A PRIMARY PROCESSING UNIT TO DESIGNATE ONE OF A PLURALITY OF DATA STREAM CONTROL CIRCUITS TO SELECTIVELY HANDLE THE HEADER PROCESSING OF INCOMING PACKETS IN ONE DATA PACKET STREAM

[76] Inventor: J. Noel Chiappa, 708 E. Woodland Dr., Grafton, Va. 23692

[21] Appl. No.: 847,880

[22] Filed: Mar. 10, 1992

Related U.S. Application Data

[63] Continuation of Ser. No. 332,530, Mar. 31, 1989, abandoned.

[51] Int. Cl.⁵ .................. G06F 9/28; G06F 13/12
[52] U.S. Cl. .................... 395/650; 395/325; 395/800; 370/60; 370/61; 364/DIG. 1; 364/228; 364/229.2; 364/230.3; 364/230.4; 364/266
[58] Field of Search ........ 364/DIG. 1, DIG. 2; 340/825.52, 825.1; 370/60, 61, 80; 395/200, 325, 650, 800

[56] References Cited

U.S. PATENT DOCUMENTS

| | | | |
|---|---|---|---|
| 3,846,763 | 11/1974 | Riikonen | 395/275 |
| 4,281,315 | 7/1981 | Bauer et al. | 364/200 |
| 4,312,065 | 1/1982 | Ulug | 370/94 |
| 4,456,957 | 6/1984 | Schieltz | 364/200 |
| 4,493,030 | 1/1985 | Barrart et al. | 364/200 |
| 4,494,230 | 1/1985 | Turner | 370/60 |
| 4,499,576 | 2/1985 | Fraser | 370/60 |
| 4,601,586 | 7/1986 | Bahr et al. | 364/200 |
| 4,630,258 | 12/1986 | McMillen et al. | 370/60 |
| 4,630,260 | 12/1986 | Toy et al. | 370/60 |
| 4,777,595 | 10/1988 | Strecker et al. | 364/200 |
| 4,807,282 | 2/1989 | Kazan et al. | 379/284 |
| 4,851,997 | 7/1989 | Tatara | 364/200 |
| 4,858,112 | 8/1989 | Puerzer et al. | 364/200 |
| 4,899,333 | 2/1990 | Roediger | 370/60 |
| 4,975,828 | 12/1990 | Wishneusky et al. | 395/325 |
| 4,979,100 | 12/1990 | Makris et al. | 395/325 |
| 4,991,133 | 2/1991 | Davis et al. | 395/375 |

OTHER PUBLICATIONS

"Hyperchannel Net Is Plugged Into the Open-Systems World," *Electronics*, Oct. 1, 1987, pp. 96–97.
"Cisco Introduces High-Performance Desktop Gateway That Allows Remote Users to Access World-Wide Networks", ciscoSystems, Inc., Mar. 4, 1988.
"Company Backgrounder Mar. 1988", ciscoSystems, Inc. Network Systems brochures.

*Primary Examiner*—Thomas C. Lee
*Assistant Examiner*—John C. Loomis
*Attorney, Agent, or Firm*—Fish & Richardson

[57] ABSTRACT

A high speed data packet switching circuit has a software controlled primary processing unit, a plurality of network interface units connected to a plurality of networks for receiving incoming data packet streams and for transmitting outgoing data packet streams, a plurality of high speed data stream hardware control circuits for processing data packets in response to instructions from the primary processing unit and circuitry for interconnecting the primary processing unit, the interface units, and the data stream control circuits. The primary processing unit receives from the network interface unit at least a first one of the data packets of each new data packet stream and assigns that stream to be processed by one of the data stream control circuits without further processing by the primary processing unit. The apparatus and method thus perform routine, repetitive processing steps on the further packets of the data stream using the high speed hardware circuitry, while the initial processing and other non-repetitive or special processing of the data packets are performed in software. Particular hardware is described for effecting the high speed hardware processing of the data packets.

17 Claims, 5 Drawing Sheets

DATA PACKET SWITCH USING A PRIMARY PROCESSING UNIT TO DESIGNATE ONE OF A PLURALITY OF DATA STREAM CONTROL CIRCUITS TO SELECTIVELY HANDLE THE HEADER PROCESSING OF INCOMING PACKETS IN ONE DATA PACKET STREAM

This is a continuation of co-pending application Ser. No. 332,530 field on Mar. 31, 1989 now abandoned.

BACKGROUND OF THE INVENTION

The invention relates generally to data communications networks and in particular to the packet switch used to direct the flow of data packets along data paths in a data communications network.

In a data communications network, a data packet switch directs data packets from one network node to another. The throughput for a packet switch can be measured in the number of either data packets per second or bits per second which pass through the switch. The former measure is important because in a typical network traffic, the bulk of the packets are small. However, when the traffic is weighted by packet size, the bulk of the data is carried in large data packets. In large bulk data transfers, the second measure is thus more important. This is a continuing dichotomy in throughput measurement. For example, the amount of work needed to switch packets is fairly constant, independent of the packet size.

The average desired values for both of these measures of packet throughput are going up quickly, just as other basic measures of computer power have been increasing. As the volume of the data transfers increases, increasingly higher throughput rates are being demanded. The increase in the volume of data transfers results as experience is gained in new systems, and more and more applications, with more and more expansive needs, are being developed. Also, quickly changing technology has made the basic underlying data transmission resource very inexpensive. Fiber optics, for example, offers data rates in the gigabyte per second range. Finally, many difficult problems in the organization of large systems can be bypassed by the free consumption of resources. The typical drop in cost of such resources has always made this an attractive path for meeting difficult system requirements.

Accordingly, the need for throughput rates substantially higher than currently available in a packet switch is presently sought. Switches more than an order of magnitude faster than current switches would seem to be required.

The present invention is directed to a class of packet switch which differs substantially from the other two classes of devices often commonly (and confusingly) referred to as packet switches.

One class of packet switch is that commonly used in digital telephone exchanges. This switch is intended only to transfer packets among the devices in a single station, such as a telephone exchange. The format of the packet in these systems is chosen to make the hardware in the switch as simple as possible; and this usually means that the packets include fields designed for direct use by the hardware. The capabilities of this class of switches (for example, in such areas as congestion control) are very limited to keep the hardware simple.

The second class of packet switch is used in networks such as X.25 networks. In some sense, these switches are little different from the switch described above, but there is a substantial difference. The format of the packets (that is, the protocols) handled by these switches is much more complex. The greater complexity is necessary since the protocols are designed to work in less restricted environments and in a much larger system, and provide a greater range of services. While the formats interpreted by the first class of switches above are chosen for easy implementation in hardware, the data packets handled by this second class of switches are generally intended to be interpreted by software (which can easily and economically handle the greater complexity).

In the third class of packet switch, the packet protocols are intended to be used in very large data networks having many very dissimilar links (such as a mix of very high speed LAN's and low speed long distance point to point lines). Examples of such protocols are the United States designed TCP/IP, and the International Standards Organization's IP/CLNS protocols.

In addition, this third class of switches (called routers) often handle multiple protocols simultaneously. Just as there are many human languages, there are many computer protocols. While a single set of telephone links and exchanges suffice to handle all human languages, in computer communication systems the switches are more involved in the carrying of data, and must understand some of the details of each protocol to be able to correctly handle data in that protocol. The routers often have to make fairly complex changes to the packets as they pass through the switch.

It is this latter class of packet switch to which this invention primarily relates. In current conventional packet switch design, a programmed general purpose processor examines each packet as it arrives over the network interface and processes the packet. Packet processing requires assignment to an outbound network interface for transmission over the next communications link in the data path. While attempts are being made to build higher speed packet switches, based on this general architecture, the attempts have not been very successful. One approach is to use faster processors; another is to make the software run faster; and a third is to apply multiple processors to the processing task. All of these approaches fail to meet the need for the reasons noted below.

The approach which uses faster processors simply keeps pace with processor dependent (future) demands since the traffic which the packet switch will handle will depend upon the speed of the user processors being used to generate the traffic. Those user processors, like the processors in the packet switches, will increase in speed at more or less the same rate and accordingly no overall increase in the ability of the future packet switch over the present packet switch, relative to traffic load, will be available. Furthermore, this approach may be impractical as not being cost-effective for wide spread use. For example, two high speed machines, distant from each other, must have intermediate switches which are all equally as powerful; deployment on a large scale of such expensive switches is not likely to be practicable.

The approach which increases the execution rate of the software itself by, for example, removing excess instructions or writing the code in assembly language, leads to a limit beyond which an increase in execution rate cannot be made. The gains which result are typically small (a few percent) and the engineering costs of such distortions in the software are significant in the long term.

The use of multiple processors to avoid the "processor bottleneck" provides some gains but again has limits. Given a code path to forward a packet, it is not plausible to split that path into more than a few stages. Three is typical: network input; protocol functions; and network output. The basis for this limitation is the overhead incurred to interface the different processors beyond a limited number of task divisions; that is, after a certain point, the increase in interface overhead outweighs the savings obtained from the additional stage. This is particularly true because of the need to tightly integrate the various components, for example, congestion control at the protocol level requires close coordination with the output device. Also, the interface overhead costs are made more severe by the complication of the interface which is required.

In general then, the multiprocessor approach is not, as expected, the answer to substantially increasing the throughput of the packet switching network. This has been borne out by several attempts by technically well-regarded groups to build packet switches using this approach. While aggregate throughput over a large number of interfaces can be obtained, this is, in reality, little different than having a large number of small switches. It has thus far proven implausible to substantially speed up a single stream using this approach.

Accordingly, it is a primary object of the present invention to increase the throughput of a data packet switch while maintaining reasonable cost, and avoiding a high complexity of circuitry.

Other objects of the invention are a high speed data packet switching circuitry and method which can handle large numbers of input streams, large numbers of output destinations and lines, and large and small data packets at high bit and packet throughput rates.

SUMMARY OF THE INVENTION

The invention relates to a method and apparatus for effecting high speed data packet switching. The switching circuit features a software controlled primary processing unit; a plurality of network interface units for receiving incoming data packet streams and for transmitting outgoing data packet streams from and to network paths respectively; a plurality of data stream control circuits or flow blocks for processing data packets in response to the primary processing unit; and circuitry for interconnecting the primary processing unit and the plurality of interface units and data stream control circuits. The primary processing unit is adapted to receive from the network interface units, and to process, at least a first one of the data packets of each new data packet stream and to assign this stream to be processed by a data stream control circuit without further intervention or processing by the primary processing unit. It is important to note that this first packet is not necessarily a "connection set up" packet or any other similar explicit direction to the switch to set up a stream. Rather, as is usual in the connectionless datagram model, this first packet is just another user data packet.

In particular aspects of the invention, the data stream control circuit features a pattern matching circuit, responsive to pattern setting signals from the primary processing unit and to the incoming data packets from the network interface units, for identifying those packets of a packet stream which will be processed by the control circuit. The data stream control circuit further features a processing unit responsive control circuit for controlling, in response to control signals sent by the primary processing unit, the congestion control and header modification, stripping and prepending functions of the data stream control circuit. The data stream control circuit further features a data buffer responsive to the pattern matching circuitry and the processing unit responsive control circuit for storing data and protocol elements of an incoming data packet stream and for outputting a data packet stream to be forwarded along a communications path.

The network interface unit features, in one aspect of the invention, a network interface circuit for communicating with a network channel and an interface adapter for receiving channel data from the network interface circuit and for transmitting that channel data over the interconnecting circuit structure to the data stream control circuits and the primary processing unit, and for receiving network data from the data stream control circuits and the primary processing unit over the interconnecting circuit structure and for providing received data to the associated network interface circuit for transmission over a network channel.

In another particular aspect of the invention, the software controlled primary processing unit features a central processing unit, bus circuitry, a plurality of input storage units for receiving respectively each of the plurality of data streams from the network interface units and each storage unit having its output connected to the bus circuitry, elements for connecting the central processing unit to the bus circuitry, and a plurality of output storage units for receiving data from the central processing unit over the bus circuitry and for providing the data to the network interface units.

The method of the invention features the step of separating from a software controlled primary processing unit used in a high speed data packet switching circuit a portion of the functionality which is repetitively used in connection with the processing of the second and further packets of an input data stream and implementing that portion of the functionality in hardware elements.

BRIEF DESCRIPTION OF THE DRAWINGS

Other objects, features, and advantages of the invention will be apparent from the following description taken together with the drawings in which.

DESCRIPTION OF A PARTICULAR PREFERRED EMBODIMENT BACKGROUND

Figure 1:
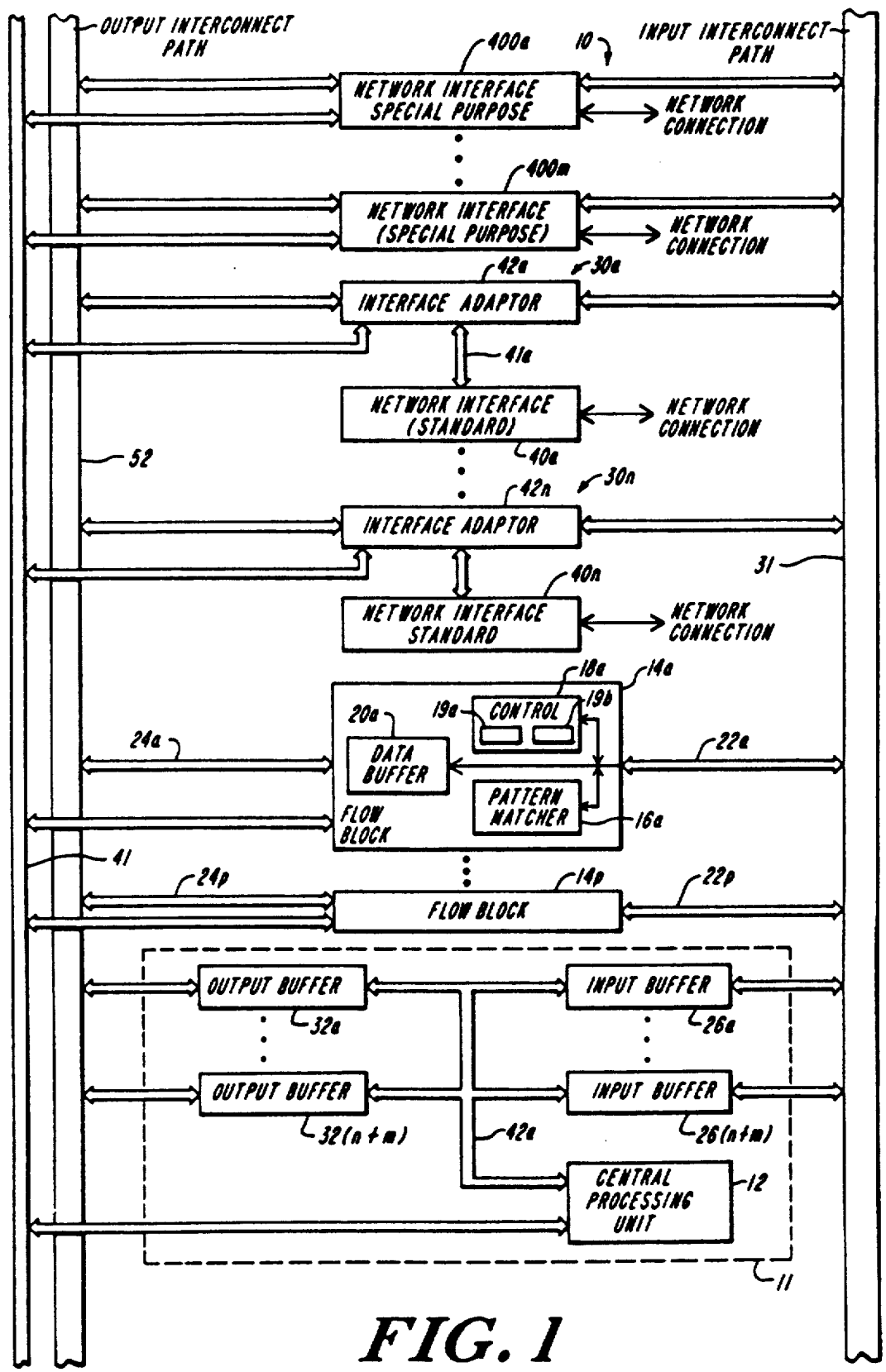
FIG. 1 is an electrical block diagram of an overall packet switching circuitry in accordance with a particular embodiment of the invention.

According to the invention, a selected portion of the packet forwarding operation, previously performed by the processor software, is moved from the software to the packet switch hardware. In this manner, all of the load on the software is removed for "normal user data packets;" and since hardware can operate at a substantially greater speed than software, substantial performance gain can be achieved. However, any attempt to translate into hardware all of the functions currently performed in software would not be possible. Typical packet switches contain tens of thousands of lines of code, and are thus of extreme complexity. To implement all of this software in hardware would require either programmability of the hardware, thus reintroducing the problem of a software system, or require an unmanageable and uneconomic configuration of hardware circuitry. Accordingly, it is necessary is to select that amount of software which can efficiently and effectively be performed in hardware and thus reduce to hardware only a small, but effective, portion of the software function.

If the software code of a typical packet switching system were monitored, most of it is exercised infrequently. It is there to handle errors, or to handle the control traffic which forms a small, albeit vital, share of the packets in the system. Very little of the code, a few percent, is used in connection with processing a "normal" packet through the switch. And it is precisely those "normal" packets which form a preponderance of the packets with which the switch deals. Thus, in one aspect, the invention herein is to select that portion of the software which will be reproduced in hardware and leave the remaining functionality in software where it is more appropriate for reasons of efficiency and support. In particular, the illustrated embodiment attempts to do so with the minimum number of circuit elements.

One way to reduce the functionality which must be reproduced in hardware is to not implement in hardware the code which handles packets other than normal data packets. It is feasible to produce a device which would handle all normal user data packets entirely in hardware. This would allow a far faster router than is available with current means.

However, even that level of reduction can be surpassed, producing an even more efficient implementation (the illustrated embodiment of the invention) if a further observation is made. In the handling of a single data packet, several operations are necessary to forward each packet. In accordance with the invention, it is recognized that many of these forwarding operations are completely repetitive when performed on individual packets which are part of a common connection path, that is, part of a data stream having a common source and often the same destination.

Thus, most packets in the system are part of ongoing transfers in which as many as thousands of similar packets flow through the switch. While the meaning of the various packets at higher levels of the communications system can be quite different, the portion of the packet protocol which concerns the packet switch is usually identical from packet to packet. Thus, judicious retention of information about a traffic stream passing through the switch is often both necessary and useful. It is necessary to implement some required functions such as flow and congestion control. It is further useful to prevent the repetitive computation of identical information for packets belonging to the same traffic stream.

It is further important to recognize that although the complexity of the functionality provided at the packet protocol layer is increasing, it does so (a) because network systems are getting larger and more mechanisms are required to make the larger systems work correctly, (b) because the user community is becoming more sophisticated, and (c) because systems are being deployed with extra functionality. This complexity has a direct bearing on the cost of forwarding packets, since many added functions are performed on each packet.

System Description

Accordingly, the illustrated embodiment of the invention operates using two important assumptions. First, that traffic streams exist and are of sufficient duration to be useful. Second, that the majority of the traffic in the network is in the streams. Both of these assumptions are reasonably descriptive of most data communications networks.

Referring to FIG. 1, in accordance with a particular embodiment of the invention, a specialized hardware 10 does all the work necessary for forwarding a "normal" packet in a previously identified packet stream from one network interface to another. All packets which the specialized hardware 10 cannot process are passed to a software controlled primary processing unit 11, including a central processing unit, CPU, 12, running software code which is more or less similar to the current software code run by the processors of most packet switches. If the packet looks like it is part of a new traffic stream, the central processing unit 12 provides the specialized hardware 10 with the necessary data parameters to deal with further packets from that packet traffic stream. Accordingly, any further packets seen from that data stream are dealt with automatically by the specialized hardware 10.

In operation, a packet switch normally examines the low level network header of an incoming packet at the input network, and removes that header from the packet. The packet is then passed to the software of the appropriate "protocol." The software generally checks the packet for errors, does certain bookkeeping on the packet, ensures that the packet is not violating flow or access controls, generates a route for the packet, and passes it to the output network. The output network constructs the outgoing network header, attaches it to the packet, and sends the packet on to the next packet switch or other destination. At all stages in the process, the packet switch must guard against data congestion.

Most of these functions are identical on packets of the same stream and can therefore be separated from those functions which vary from packet to packet in the same packet stream. The repetitive functions can be performed once in software at CPU 12, at the time the hardware is first set up for a packet stream, that is, at the time the first packet of the stream is being processed. At this time, the hardware itself has very little that it is able to do. Thereafter, the hardware will handle all succeeding packets of the stream without any further intervention from the central processing unit.

The illustrated specialized hardware 10 has a plurality of data stream control circuits (flow blocks) 14a, 14b, . . . ,14p, each flow block having a pattern matching hardware 16, a control circuitry 18, and a data buffer 20. An input bus 22 connects, as described below, to any of the inbound network interfaces, and an output bus 24 can connect to any outbound network interface. There is further associated with each input network interface a CPU input storage buffer 26, the output of which is directed to the CPU 12 for handling special packets, that is, packets which are not "normal," and a CPU output storage buffer 32, for receiving special packets from the CPU 12 for transmission to the network interfaces.

The network interface devices 30 or 400, as viewed from the packet processing elements, (either flow blocks 14, or CPU 12 and storage buffers 26, 32), are pure sources or sinks of data. They are always functioning autonomously, and accordingly no intervention is required on the part of the flow blocks 14 or storage buffers 26, 32 and CPU 12 to keep these network interface devices operating. The flow blocks 14 should not interact with the network interfaces since that interaction would require extra complexity in the flow block, a cost to be paid for in each flow block, and not by the network interface. Further, the central processor 12 should not control the network operation since that control inevitably slows the central processor operation, as well as the network. Accordingly, each network interface device is an autonomous unit.

In the illustrated embodiment, two classes of network interface devices are illustrated. The network interfaces 30a, . . . ,30n, each include a network interface adapter 42, and a standard network interface circuit 40. The network interfaces 30 connect to an input interconnect path 31, an output interconnect path 52, and a CPU standard bus 41 for complete communications with all other circuit elements of the packet switch, and receive data from and transmit data to the associated standard network interface circuit 40. The other class of network interface device is the special purpose network interface 400 which connects to the input interconnect path 31, the output interconnect path 52, the CPU standard bus 41, and also to the associated network.

In the illustrated embodiment, the packet switch is configured so that it can be expanded as necessary to support more traffic streams. The expansion can be easily implemented by adding additional flow block circuitries, and if necessary, additional network interface devices. This allows an existing unit to be scaled up as the traffic load grows.

In operation, a traffic stream is received and first identified by the CPU 12, as it receives the first packet of a new traffic stream from a CPU input buffer 26 connected to the input interconnect path 31. A free flow block 14 is selected to handle future packets of that traffic stream and all of the necessary information to handle the traffic stream, including the identification of the stream, is loaded into the pattern matching circuitry 16 and the control circuitry 18 of the selected flow block over the CPU bus 41.

As each subsequent packet of the stream arrives at the packet switch interface circuit, it is handled by the network interface 30 (for ease of explanation it is generally assumed that the receiving network device will be an interface 30) and flow block 14 without intervention by the CPU 12. In particular, as it is received at interface circuit 30, it passes through the network interface circuitry 30 and is placed on the input interconnect path 31 so that each flow block 14, assigned to that interface, can check the packet, in parallel, to determine if any one of those flow blocks recognizes the packet as being assigned to it. If a match is found, the packet is accepted by that flow block and the data, usually modified by the control circuitry 18 of the flow block, is read and stored by the flow block. Further circuitry of control circuitry 18 will remove the packet from the data buffer 20 of the flow block 14, with a new header prepended thereto, when the system is ready to send the packet over the next link of the data communications path.

Any packet which is not recognized by any of the flow blocks is available to the CPU from the one of the CPU input buffers 26 assigned for receiving data from that network interface. The CPU input buffer for each network automatically starts to copy each packet from the input interconnect path 31 each time a packet arrives, and continues to do so until one of the flow blocks 14 for that network interface accepts, or all flow blocks assigned to that network interface reject, the packet. If the packet was accepted by one of the assigned flow block circuitries, the portion of the data stored in the associated CPU input buffer 26 is discarded, and the CPU input buffer resets to await the next packet from that network interface. If the packet is rejected by those flow blocks assigned to that network interface, the associated buffer 26 passes the packet to the processor 12 which will analyze the packet and process it accordingly. It is important to note that no conflict arises from trying to put two packets into a CPU input buffer at the same time since each network interface has its own associated buffer 26 and a network interface 30 can receive only one packet at a time.

The CPU 12 further has access to the set of output buffers 32 (one buffer for each output network) over a bus 420, through which it can send packets to the network interfaces over output interconnect path 52 for transmission along a link of the transmission chain.

Description of Detailed Elements

Network Interface

Data enters the packet switch from a network through the network interface. As noted above, these units are autonomous. They can be constructed either by building the special purpose hardware 400, one for each network, which enables a network to connect directly with the respective interconnect paths, or by providing the standard adapter 42, into which an existing off-the-shelf hardware network interface 40 can be inserted. The two classes of hardware can both be advantageously used in the same embodiment.

Referring to FIG. 1, the second approach employs a standard network interface element 40 (typically an off-the-shelf commercially available circuitry) which connects over lines 41a (which is usually a standard bus) to the associated interface adapter 42. Each adapter 42 has a standard interface connection which connects to the input interconnect path 31 for eventual connection to an as yet unknown one of the flow blocks 14 and to the network associated storage buffer 26. The interface adapter also has a standard bus interface which connects to CPU bus 41. The interface adapter 42 also provides a third interface for receiving packets from the flow blocks over the output interconnect path 52. Adapter 42 provides those received packets, to the associated network interface 40 for transmission over a network path to the next network connection. The choice of this second interface approach is convenient and allows for modular expansion and network interface card interchangeability; however, use of the adapter 42 with a separate network interface 40 is likely to be more expensive than a special purpose network interface card 400.

The choice of which network interface approach is adapted thus depends upon both cost and speed. The interface adapter 42 with its various bus connections is, most likely, the slower path unless the bus 41a is very fast; and even then, most current network interfaces for high speed networks cannot keep up with a network which is running at maximum capacity. Additionally, the use of several cards is likely to be more expensive. Accordingly, it may be desirable to provide the special purpose network interfaces, such as a special network interface 400, which connect to interconnect paths 31 and 52, for high volume networks where speed is more important; whereas the slower network interface, employing off the shelf components, can be employed where speed is not as important or where the construction of special purpose hardware is not cost justified.

The autonomous interface network unit is, as noted above, responsible, on the input side, only for ensuring that all packets destined for the switch are received from the network and are fed to the flow blocks 14 and storage buffers 26. Congestion and control are the responsibility of the flow blocks 14 and the control devices 18 therein. Similarly, the output side of the network interfaces 30 needs only to read data packets sent by the flow blocks 14 and buffers 32, and transmits them over the selected network.

It is also possible that inexpensive and slow network interfaces can be connected directly to the standard bus 41 and be run by the general purpose CPU 12 rather than by the interface adapter 42. These packets would then be sent on whichever path the processor normally uses to send packets which it originates. This is an acceptable alternative, subject to the speed and time requirements imposed upon the central processor. The standard bus also provides the central processor unit with full access to the standard network interfaces 40 and special network interfaces 400 through the network adapter 42 so that any network interface can be controlled by the CPU 12 when unusual functions, such as problems with the transmission layer, fault isolation, or other complex testing tasks must be performed.

The Interconnect Path

As noted above, each interface adapter 42 or special network interface 400 connects to each of the flow blocks 14 in a most general form of illustrated structure. Depending upon the economics and speed desired, the interconnect circuitry can take a variety of forms using a number of techniques which are already known in the art. One particular approach, using "brute force," is to use a full crossbar switch to make all possible connections between each of the network interface adapters and each of the flow blocks, both on the input and the output interconnect paths. As the flow blocks are assigned, and reassigned, between interface adapter units and special network interfaces, the various points of the crossbar can be opened and closed.

An alternate approach, used in digital telephone systems, is to interface all of the functional units to a high speed, time division, multiplexed bus. This approach requires less switch hardware but necessitates a bus speed comparable to the maximum speed of an interface times the number of interfaces. Such speed requirements may make it less economical to build such a bus than might otherwise appear.

The input interconnect path is conceptually simple in that flow blocks 14 are assigned to but a single network interface at a time. The relationship is not symmetrical, however. The input network interface thus feeds at most one input packet at a time to the flow blocks; however, the input packet can be read by many different flow blocks, all of which are assigned to that network interface. The output side of the flow blocks is slightly more complex since several flow blocks, each connected to a different network interface at its input, may present a packet to the same output network interface simultaneously. The output interconnect must thus have some method for choosing which, and in what order, to send the packets. For example, it can service the flow blocks in the same order specified by the CPU when the processor sets up the traffic stream; or preferably, a grant passing ring configuration can be employed. It is important, however, to be sure to allocate appropriate bandwidths to each stream so that acceptable operation is attained. There are various concepts for performing this function, well known to those practiced in the art, and they will not be discussed here in any further detail.

The Flow Blocks 14

Each flow block 14 consists, as noted above, of a pattern matching circuit, the flow block data buffer 20, and the control device 18. The pattern matching hardware, in the illustrated embodiment of the invention, contains two variable length bit strings: a "match" bit string and a "mask" bit string. Those fields in the packet which can vary among the packets of a single stream, are set "on" in the "mask" string. Values in these bits are then ignored. The values in the fields which identify a stream, and which are always present in a packet of the stream, are stored in the "match" bit string. Several functions can thus be performed by the pattern matching circuitry 16, in addition to merely checking the assignment of a packet to a traffic stream. For example, certain error checks (for valid values) can be performed. Also, since a flow block 14 is assigned by the CPU 12 to forward a traffic stream only if a route for the traffic stream exists, and if the traffic stream is authorized by the access control software in the CPU 12, a match by the circuitry 16 immediately implies that the packet is allowed by the access control to pass through the switch, and that a route for the packet exists.

The data buffer 20 of a flow block can be implemented in a variety of ways. The simplest approach, is to have associated with each flow block a separate memory array having head and tail registers to allow reading and writing. Two disadvantages to this approach are that it requires additional hardware and the buffer memory is split up into many small memory banks rather than employing a single large memory bank for the entire packet switch.

Nevertheless, the use of a large memory bank, from which each flow block buffer memory is allocated, results in a complex storage management problem. It is necessary in such a memory structure to maintain a list of unused blocks, a mapping of the used blocks, etc. In addition, the flow control mechanism must be more complex, particularly if there is less total buffering than the sum of the maximum storages of all of the data streams. It must therefore deal with a global resource shortage of buffer memory in the switch. This problem can thus remove a primary advantage of having a large memory bank. In addition, with separate memory banks, each bank need only be able to support two simultaneous accesses: a read and a write. With a single large bank, all of the network interface accesses must be handled simultaneously.

A number of practical operating problems exist with the circuitry illustrated in FIG. 1. Thus, if there are more identified traffic streams than there are flow blocks, or if a single packet stream is to be routed over multiple paths by the network protocol, appropriate hardware must be available to deal with the various circumstances. In particular, if there are more identified traffic streams than there are flow blocks 14, it is important to avoid "thrashing" as the streams compete for the flow blocks. If the protocol has adequate flow and congestion control mechanisms, these can be used to inhibit the excess streams. Also, the flow blocks should be packaged and interfaced to the rest of the system so that additional flow blocks can be installed as load patterns change or as switches experience higher usage rates than they are able to handle.

Further, the software can maintain a record of the streams including the time when each flow block was last used, so that periodic scans can be made by the software to find flow blocks which are associated with streams that are no longer active and list those flow blocks as ready for reuse. Further, the software can maintain a record of the stream parameters so that if a previously terminated stream should restart, it would not be necessary to recompute everything. Preferably, the CPU stores this information in its local memory.

It may also be desirable to avoid assigning a stream to a flow block until a minimum number of packets relating to a stream have been counted. In this instance the CPU 12 can maintain the necessary information regarding the stream (and pass the packets of the stream on to the next network node) and dedicate a flow block to that stream only after the length of the stream has been assessed.

There are also instances when a single packet is forwarded over multiple paths. The situation can thus exist when packets of the same data stream are received over two different network interfaces and/or where a single packet stream must be divided and forwarded to two or more output networks. The first problem can be handled simply by allocating one flow block to each interface. The second problem is somewhat harder to handle; however, in most protocols, there is a sequence field in each packet wherein it is possible to assign two different flow blocks to the stream in which the sequence field was masked out except for, for example, the lowest bit. In one flow block the bit would have to match to "zero" and in the other flow block to "one." Thereafter, each flow block can be assigned to a different output stream, the split being roughly into two divisions. More complex and controlled splitting requires more sophisticated mechanisms to effect proper queuing and sequencing on the output.

The Flow Block Circuitry

In the description of this particular embodiment, the width of the various buses, the number of identical interface units or flow blocks, the length of a counter, etc., are subject to the particular switching system environment and capacity. Accordingly, while specific numbers are suggested from time to time, the values "N", "n", "P", etc. are variable and may be equal to each other or not as the particular embodiment requires.

Referring to FIG. 1, the flow block control device circuitry 18 effects bookkeeping functions at the protocol level and flow and congestion control. One functional unit 19a of each control circuitry 18 strips the input header from a packet before it enters the flow block data buffer 20 and another functional unit 19b of the control circuitry prepends the output header to the data packet before it exits the flow block data buffer.

In addition, each protocol tends to have certain bookkeeping functions which must be performed on each packet of the stream; however, these functions tend to be slightly different for each protocol. The design of the illustrated control device provides flexibility for handling the different protocols, including in particular the capability of computing the checksum (and signaling an error should one occur), and updating the "hop" count. The control circuitry 18 also needs to be flexible enough to handle the different protocols in a very short time. Accordingly, the design preferably allows for additional circuitry to be added to the protocol function circuitry 19a and 19b. The additional circuitry can also be implemented in the state machine controller for the flow block.

The flow block control circuitry also acts as a flow control agent. Thus, if packets are entering the flow block at too fast a rate, an error is caused. The specific hardware configuration depends on the protocol architecture and the policy implemented therein. One effective mechanism uses the error alarm signal to show that the flow block buffer is filled past a selected level. The control circuitry also needs to set a so-called "discard" level. This is necessary to protect the congestion control mechanism of the switch from being overloaded by a single, out of control, data stream. Such a mechanism would cause a selectable percentage of the incoming packets of a stream to be ignored completely rather than passed, over bus 41, to the congestion control mechanism of the CPU 12, which it could overload.

The Interconnect Path Operation

In the illustrated embodiment of the invention, the presently preferred embodiment of the interconnect paths 31 and 52 uses the simple, brute force, approach; that is, a full cross bar is provided for each interconnect path by assigning a separate bus to each network interface adapter 30, to which each of flow blocks 14 and buffers 26 is connected. Each bus has a full set of control lines for, and in addition to, the data lines of the bus. The illustrated interconnect circuitry thus consists of a set of, for example, "N" identical buses. The interconnect further can include some general signal lines such as, for example, a system reset line. The full cross bar is also large enough to support the maximum complement of interface circuitries simultaneously, each interface being able to proceed at full speed with no buffering.

Considering in particular the input interconnect 31, there are R buses, "R" being equal to the sum of the number of special network interface units 400 and interface adapter 42. Each interface data bus is "M" bits wide, and is driven only by the associated network adapter 30 or interface 400. In addition to the data from each network interface 30, each bus also has a plurality of control signals for controlling the transfer of the incoming packets from the network to the flow blocks 14 and buffers 26. The control signals allow a flow block 14 to indicate to the associated CPU input buffer 26 (and CPU 12) whether the packet has been accepted.

Figure 2:
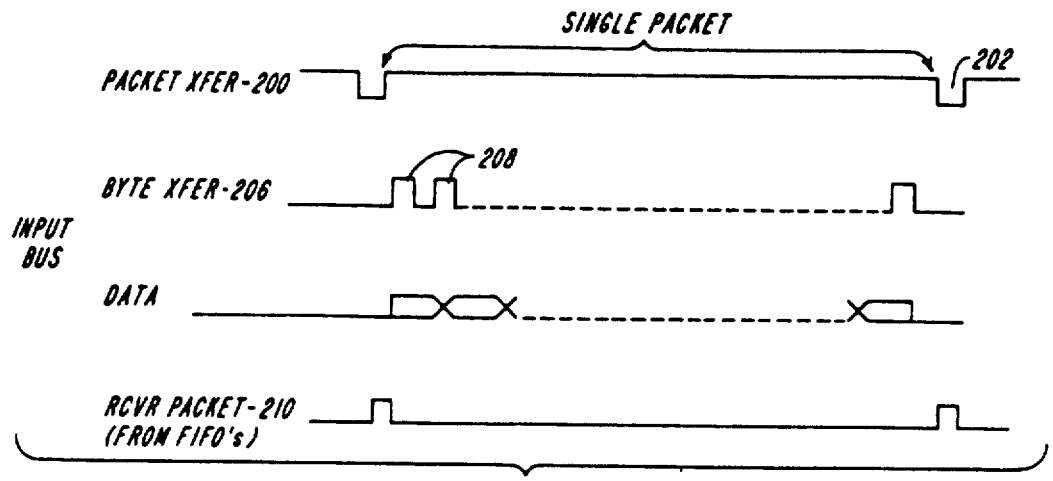
FIG. 2 is a timing diagram of an input interconnect circuitry according to a particular embodiment of the invention.

Referring to FIG. 2, the control signal functions can be performed with two lines, both driven by the network interface or adapter and "listened" to by all of the flow blocks assigned to that network (including the corresponding CPU input buffer 26 assigned to that network). One line 200 indicates when a packet is being transferred and is active for the duration of the packet transfer. A non-active period 202 has a minimum time duration so that the next active period (and the next packet) is spaced in time from the previous active period. The beginning of the inactive period indicates the end of the packet. A second line 206 is a "word transfer" line and each active transition 208 on that line signals that a new word (a byte in the illustrated embodiment) of data has been placed on the bus by the network interface.

There is further a common control line 210 which can be driven by any of the flow blocks 14 and listened to by the CPU input buffer 26 for that network. When going active, it signals to the CPU that the current packet has been accepted by a flow block and the packet may thus be ignored by the CPU 12. The timing must be carefully controlled, especially if faults are to be detected. For example, if the packet length in the protocol header is to be verified, it is necessary to wait until the entire packet has been received before accepting the packet. However, by that time, the next packet is starting. This problem also arises when verifying header check sums for packets with no data. The timing can be resolved by having the accept line driven at a time during the mandatory non-active period of the packet line, that is, after the packet has completely arrived and before the next packet begins.

Figure 3:
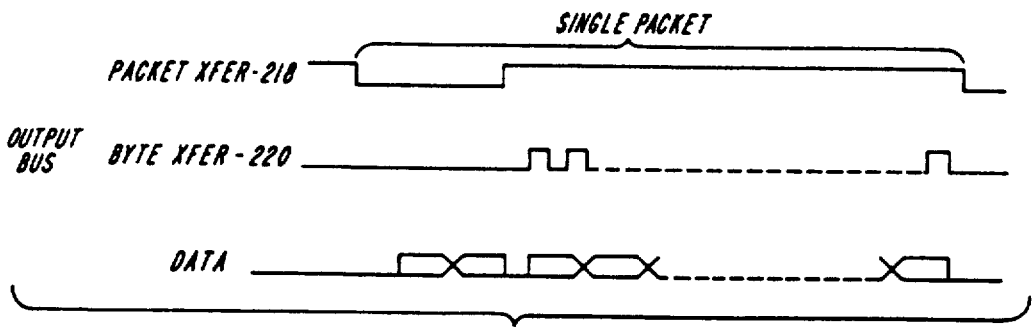
FIG. 3 is a timing diagram of an output interconnect circuitry in accordance with a particular embodiment of the invention.

Referring to FIG. 3, the output interconnect 52 has a slightly more complex data bus. The bus is "P" bits wide and is driven by a sequentially varying one of the flow blocks 14 and buffers 32 (the "driving circuits") assigned to the connected network interface. The output of the driving circuit is read by the associated network interface 30 or 400. Preferably, the driving circuits are arranged as, and include the circuitry to form, a grant-passing ring. In addition, there are other control lines which are used to control the transfer of the packet from the drive circuit having the grant. These other lines 218, 220 are substantially the same as those control lines 200, 206 of the input interconnect bus. After a packet has been transferred to a network interface, the "grant" advances to the next driving circuit. If the identified driving circuit has a packet waiting at the time the grant line becomes active (typically the rising edge), it begins a transfer. Otherwise, the grant is passed to the next driving circuit which repeats the process.

Flow Block Details

Figure 4:
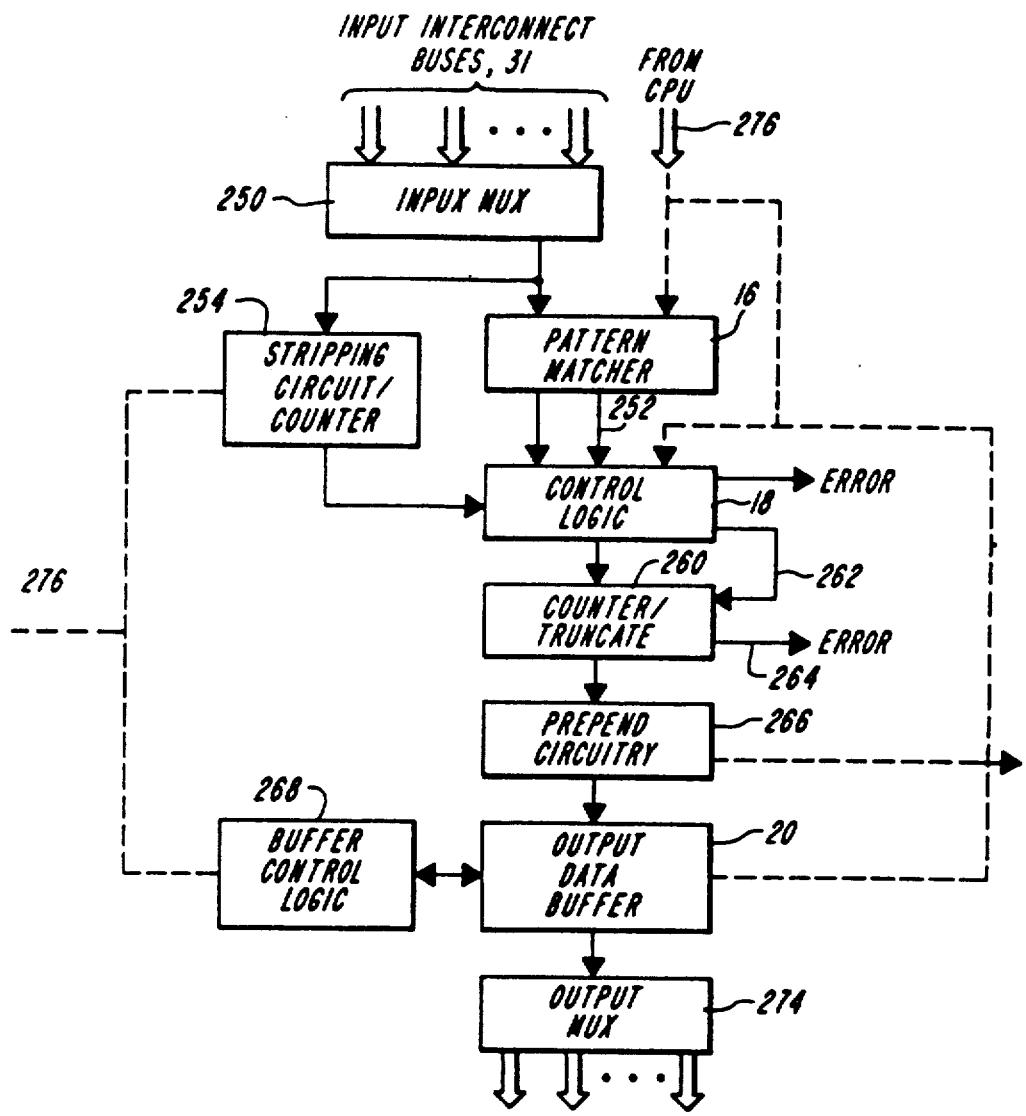
FIG. 4 is a detailed block diagram of the control circuitry according to a particular embodiment of the invention.

As noted above, the flow blocks 14 has several major functional units. The stages, in the illustrated embodiment, are connected asynchronously since the throughput of the stages is not constant and some stages have buffering between them. Referring to FIG. 4, the circuit structure of flow block 14, considered in more detail, has an input multiplexor 250 which selects the current input bus and passes the data to both the pattern matcher 16 and the rest of the flow block. The pattern matcher, as noted above, examines the header of the incoming packet. If it matches the pattern to be handled by this flow block, the match is indicated by a signal over a line 252 to the control device logic 18.

Simultaneously, data from the input bus flows through a stripping circuit 254 which includes a counter and which discards the first "n" bytes of data (the header) allowing the remainder of the packet to pass through unmodified. The packet then passes to the control logic 18 where the higher level protocol functions such as check sum computation and hop count modification occur. The control logic 18, pattern matcher 16, and stripping circuit 254 have all been previously loaded with other necessary data from CPU 12 over bus 41. The input to the control device has a small amount of buffering to allow the control device to take more than one cycle when processing certain bytes in the data stream. The packet passing through this stage of processing may be modified; for example, this stage may abort further processing of the packet if an error is found, as described in more detail below. The packet then passes to a counter/truncate circuitry 260 which contains a counter loaded by the control logic over circuitry 262. The counter serves two functions: any unused trailer in the packet is discarded, and, if the packet is truncated, an error flag is raised over a line 264. The next stage of processing, a circuitry 266, prepends "n" bytes of data, the new output header, loaded from the CPU 12 in a similar manner to stripping circuit 254, to the packet as it passes therethrough. It also contains some buffering on the input to allow the new packet header to be inserted. In those instances where the new packet is substantially larger than the old one, the buffering is a necessity. The packet next passes to the output data buffer 20 which consists of a dual port (one read-only and one write-only) memory, along with a control logic 268 to keep track of the packets in the buffer. The buffer 20 is organized in a ring structure and a hardware queue of "t" buffer pointer/size pairs keeps track of the utilization of the buffer. Additional control circuitry within the buffer keeps track of the current start and end of the "free space". The packet then passes to an output multiplexor 274 which has output bus control logic and a set of drivers, one for each output bus in the output interconnect 52. When the flow block receives the "grant," for the appropriate output network interface 30, as described above, packets which are in the output buffer are read out and passed along the bus. Throughout the flow block, there are, in addition, data paths 276 which allow the CPU 12, over bus 41, to load memories, etc. in order to maintain proper operation of the flow block.

Figure 5:
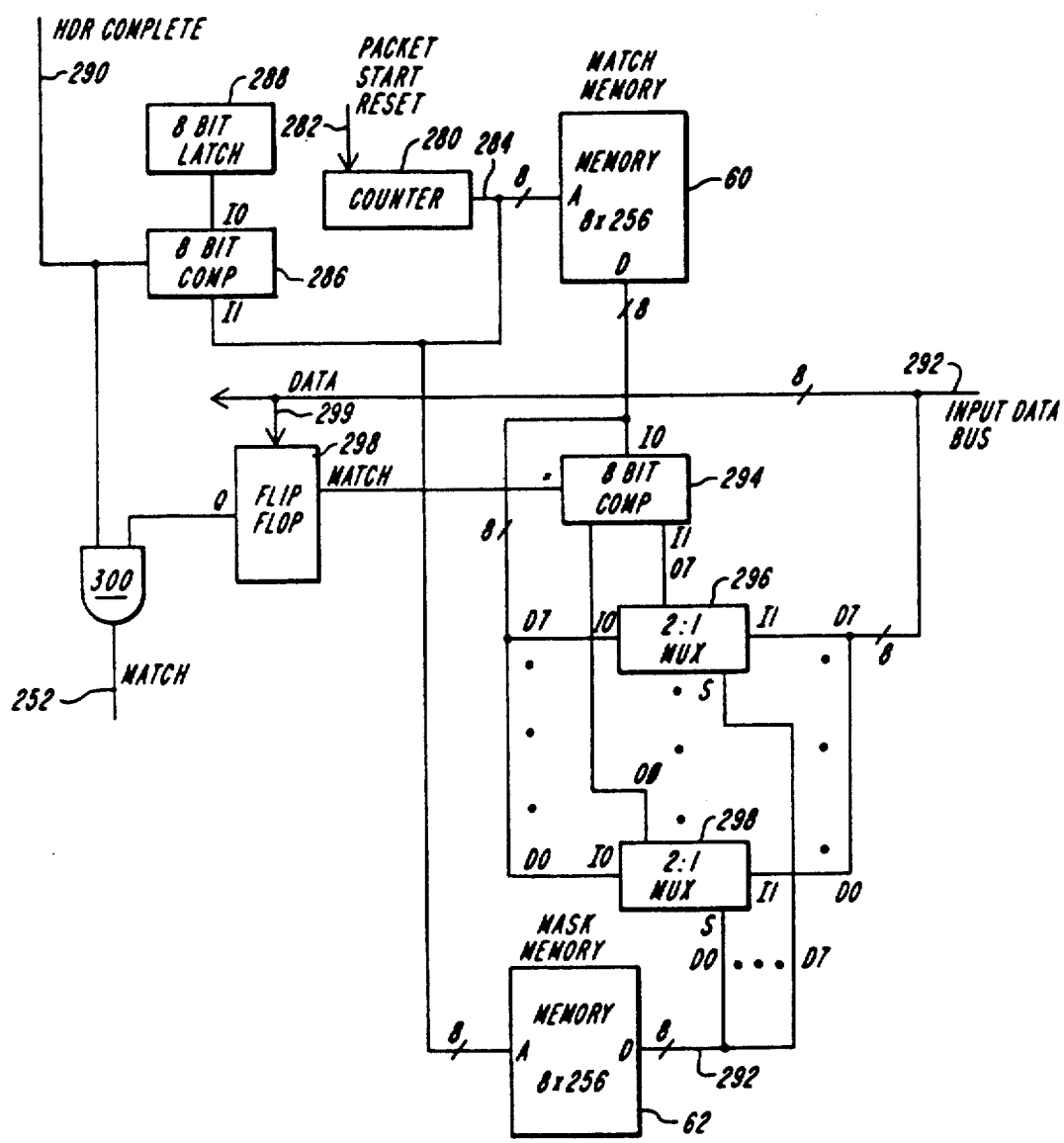
FIG. 5 is a detailed block diagram of the pattern matching circuitry according to a particular embodiment of the invention.

Referring to FIG. 5, the pattern matcher 16 has two small memories 60, 62 each "a" bits wide and "b" bytes long. In the illustrated embodiment, 8×256 bit RAM's are employed. One memory 62 contains the "masked" bits and the other memory 60 contains the "match" bits. More precisely, for those header positions for which a bit is "on" in the mask memory, the packet can have any value in the header whereas, if a bit is "off" in the mask memory, those corresponding bits in the packet header must match the CPU predetermined values stored in the match memory.

The pattern matcher can operate with varying quantities of data in the memories 60, 62, and if all the mask "off" bits in the header match the "match" memory bits, the header is a "match", as indicated over line 252, and the flow block continues to read the packet. In the illustrated embodiment, an "n" bit counter 280 is reset over a line 282 when the packet begins arriving and counts up "one" for each byte received from the bus. The output of the counter over lines 284 is used as an index into the two memories and is directed, also, to an "n" bit comparator 286. Comparator 286 compares the output of counter 280 with the output of an "n" bit latch 288 which holds the current header size count. When the count reaches the header count, a header complete signal is generated over a line 290.

The comparison of the input header to the match word is effected byte-by-byte, using an eight bit comparator 294 and a series of eight identical two-to-one multiplexors 296. The output of the match memory is one input of the identical two-to-one multiplexors 296 with the "n" bits (typically eight bits) from the data bus 292 as the other input. In each multiplexor, the select input is driven by the corresponding output bit over lines 292 of the mask memory; so that if a mask bit is "off", the data bus bit is selected. Otherwise, the match bit is selected. The "n" selected bits are then fed into the "n" bit (illustrated as eight bits) comparator 294 which, as noted above, receives the original match data word as the other input.

The output of the comparator is fed to a flip flop 298 which is set by a signal over a line 299 when the packet begins to be read. If any byte of the header fails to have a complete match (of the selected bits), the output of the comparator goes low and clears (resets) the flip flop. If the flip flop is still set when the counter 280 has also reached a match (the end of the header), the packet header is accepted and the logical "AND" circuit 300 provides the match indication signal over line 252.

In addition, the pattern matcher further contains data pads, not shown, which allow the CPU 12 to load (through bus 41) the match and mask memories 60, 62, the length latch 288, and other data as well.

Figure 6:
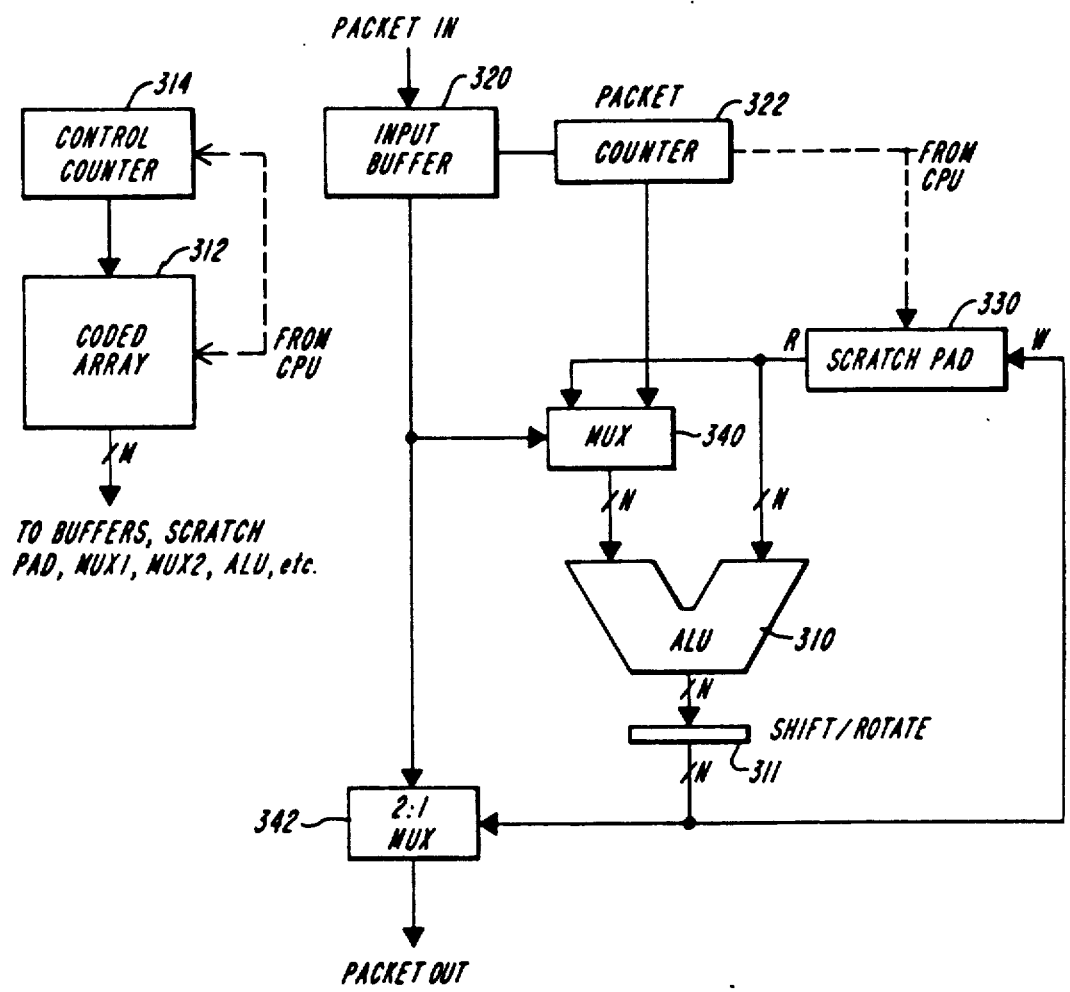
FIG. 6 is a detailed block diagram of the control circuitry of the flow blocks according to a particular embodiment of the invention.

Referring now to FIG. 6, the data stream control unit 18 (and stripping circuitry 254) has an arithmetic logic unit (ALU) 310, special purpose logic which will be described hereinafter, and a control table stored in a memory 312. The ALU and the control store act like a general purpose microcode engine, but one which has been specialized to create a very minimal, high speed processor for packet headers. The functions to be performed, as described above, are very limited.

The illustrated circuitry allows the processing of the headers in the transmission time of a complete packet having no data, thus allowing the flow block to operate at full network bandwidth with minimum sized packets. In addition, the control device keeps its required cycle time as high as possible (that is, operates as slow as possible) to keep its costs down.

In the illustrated typical circuitry, the control table 312 is the heart of the control device. It consists of an array of words, which are horizontal microcode, used to directly control the ALU and gates of the control circuit as is well known in the art. While some fields of the control word will perform standard operations, such as selecting which ALU operation is to be performed on each cycle, other fields will control the special logic associated with packet forwarding.

The illustrated control circuitry further includes a control counter 314 which is set at the start of each packet. The counter selects one of the control words in the control array (the output of the control word controlling the logic elements of the control device). While processing a packet, this counter is incremented at the cycle speed of the control device, essentially asynchronous to the rest of the system, thereby stepping through the control table at a fixed rate. The input data packet flows through an input FIFO buffer 320, the output of which is controlled by a bit in the control table 312. If the bit is "on," a byte is read out of the input buffer. This function, which is thus not performed automatically when data is read from the buffer, allows data to be passed through under control of the local processor, and allows certain bytes of the packet to be operated on by more than one control word without the necessity of storing the byte in an intermediate location. A second counter 322, cleared at the start of each packet, counts the current data byte and provides that count for use by the rest of the control device 18.

Another bit of the control word from array 312, effectively disables the control device, thereby allowing the rest of the packet to pass through to the next stage of processing. This bit is set in the last control word of the process sequence, that is, once processing of the header has been completed. Another field of the control word controls the logic which cancels the packet if certain conditions are true. This field is thus used to cancel processing of the packet when fatal errors are detected.

The control circuitry also includes several scratch pad registers 330. These registers allow accumulation of results etc., and provide constants for use by the ALU 310. The scratch pad registers 330 can be loaded by the CPU 12 during that process by which the CPU selects a flow block to receive a data packet stream.

The apparatus further has a multiplexor 340 to allow selection from the variety of data sources available as inputs to the ALU. The results of the ALU processing can be sent to a number of circuitries. In particular, inputs to the multiplexor 340 come from either the input data buffer 320, count register 322, or the scratch pad registers 330. Data may be written from the ALU 310, through a shift/rotate register 311, to either the scratch pad registers, or output from the control unit through an output multiplexor 342. Further, a pass around path 343 allows the result of an ALU calculation to be sent to a register while a data byte is sent to the output. Other data paths not shown are available which allow the CPU 12 to load the control table, the scratch pad registers 330, the counters 314, 322, etc. when a flow block is selected to receive a data packet stream.

As noted above, the illustrated embodiment provides for a flexible flow block configuration which, when loaded from CPU 12 with protocol setting data signals, enables the flow block to handle a particular one of a plurality of packet stream protocols. In an alternative embodiment of the invention, each flow block can have implemented therein, in hardware, the necessary circuitry to enable it to handle one (or more) particular protocols. Accordingly therefore, different hardware modules would be needed for different protocols; however, some speed advantage can be obtained by reducing the flexibility of the hardware controlled flow block.

In addition, further circuit efficiency can be obtained, without loss of flexibility, if those flow blocks which can be assigned to a particular interface share the same ALU circuitry (FIG. 6). Recalling that ALU 310 operates to process an incoming data packet, and, since only one data packet can be received from a network at a time, all of the flow blocks assigned to a particular network interface can then share the same ALU since only one of the assigned flow blocks will be active for receiving a data packet at any particular instant. This savings in circuitry can, for example, be advantageously implemented when a plurality of flow blocks are provided on the same card module. In that configuration, all flow blocks of a card module which share an ALU should be used in connection with the same selected network interface, and in particular, as noted above, the card module may be implemented fully in hardware with different flow blocks of the card module being used for different protocols.

Additions, subtractions, deletions and other modifications to the illustrated embodiment of the invention will be apparent to those practiced in the art and are within the scope of the following claims.

What is claimed is:

1. A high speed data packet switching circuit comprising:
   a software controlled primary processing units,
   a plurality of network interface units for receiving incoming data packet streams and for transmitting outgoing data packet streams, each of said data packet streams having a selected protocol and all of the data packets in a said stream having the identical protocol,
   a plurality of data stream control circuits for concurrently receiving at least a portion of a header of the data packets and selectively processing the received packets only wherein each said data stream control circuit processes the data packets of one data stream having one of said selected protocol in response to previously generated electrical signals from the primary processing unit based upon header identification information in the at least first data packet of the new data packet stream for designating and initializing one of said data stream control circuits to process a remainder of the data packets of the new data packet stream,
   means for interconnecting said primary processing unit, said plurality of interface units and said plurality of data stream control circuits,
   said primary processing unit receiving from said network interface units, and for processing, at least a first one of the data packets of a new data packet stream and having means for generating said electrical signals means in each said designated and initialized data stream control circuit for receiving and processing only those data packets which include said header identification information upon which said designated and initializing is based.

2. The packet switching circuit of claim 1 further wherein each data stream control circuit comprises
   a pattern machining circuit responsive to pattern setting signals from the primary processing unit and to incoming data packets from said network interface units for identifying and receiving a packet stream which will be processed by said control circuit,
   a processing unit responsive control circuit for controlling, in response to control signals sent by the primary processing unit, a congestion control means, and a header stripping and prepending functions means for the data stream control circuit, and
   a data buffer responsive to said pattern matching circuit and the processing unit responsive control circuit for receiving and storing data and protocol elements for an incoming data packet stream and for outputting a data packet stream to a said network interface unit to be forwarded to a next network node.

3. The packet switching circuit of claim 2 wherein said pattern matching circuit comprises
   a mask bit memory,
   a match bit memory, and
   means for comparing data bits of incoming data packets, not masked by a data word from the mask bit memory with an output of the match bit memory for determining the validity of an incoming data stream packet.

4. The packet switching circuit of claim 2 wherein said pattern matching circuit comprises
   a match memory
   a mask memory,
   a comparator circuitry, and
   means for inputting, to the comparator circuitry, data bits from the match memory and corresponding data bits from an input packet, said corresponding data bits being selected in accordance with the bit values in the mask memory, for determining the acceptability of an input packet.

5. The packet switching circuit of claim 4, wherein said pattern matching circuit further comprises
   means for determining the end of an input header for an input packet,
   to the comparator circuit for determining whether all of the matched bits in the input header are valid, and
   means for providing an acceptance signal in response to a valid output of the comparator responsive means and the header determining means.

6. The high speed data packet switching circuit of claim 2 wherein the processing unit responsive control circuit comprises
   a table array storage for storing horizontal microcode,
   a control counter for selecting words of the table array storage,
   an arithmetic logic unit, and
   means for controlling operation of the processing unit responsive control circuit using horizontal microcode output of the table array memory.

7. The packet switching circuit of claim 1 wherein said data stream control circuit comprises
   an input multiplexor for selecting a data packet stream source from among the interconnecting means accessible to the control circuit;
   a pattern matching circuit responsive to pattern setting signals from the primary processing unit and to incoming data packets from the input multiplexor for identifying those data packets which will be processed by the control circuit.
   a header stripping circuitry for removing the header from each data packet from the input multiplexor.
   control logic, responsive to the pattern matching circuit and to the stripping circuitry, for passing the data packet, without the header, for further processing by the control circuit,
   a counter/truncator circuit for determining whether the data packet from the control logic is truncated and for providing an error signal in the event the packet is truncated,
   a prepend circuitry for adding a new header to the data packet from the counter/truncator circuit,
   an output data buffer for buffering the data packet from the prepend circuitry and responsive to a buffer control logic, for maintaining accurate status data regarding the contents of the buffer, and for outputting a next data packet for transmission over a network, and
   an output demultiplexor connected to the output data buffer for transmitting data from the output data buffer over the output interconnecting path.

8. The packet switching circuit of claim 1 further wherein said network interface unit comprises a network interface circuit for communicating with a network channel in accordance with a said selected protocol and delivering data from the channel in a predetermined format, and an interface adapter for receiving data from the channel through the network interface circuit in said predetermined format and for transmitting that data from the channel over the interconnecting means to said data stream control circuits and said primary processing unit, for receiving data, to be sent over a network channel, over said interconnecting means from the data stream control circuit and the primary processing unit and for delivering data received from said interconnecting means to said network interface circuit for transmission over a said network channel.

9. The packet switching circuit of claim 8 wherein said network interface unit further comprises a single network special purpose hardware interface circuit having means for communicating with a network channel, means for transmitting received network data over the interconnecting means to said data stream control circuits and said primary processing unit, means for receiving network data packets from the data stream control circuits and the primary processing unit, and means for processing the received data packets for transmission over a network channel.

10. The packet switching circuit of claim 1 wherein said software controlled primary processing unit further includes a central processing unit, a bus means;

a plurality of input storage units for selectively receiving ones of said plurality of data streams from the network interface units and each storage unit having its output connected to said bus means, means for connecting the central processing unit to said bus means, a plurality of output storage units for selectively receiving data from said central processing unit over said bus means, and for providing said data to said network interface units, and means for controlling the input of data to said input and output storage units.

11. The packet switching circuit of claim 1 wherein said interconnecting means comprises an input bus for interconnecting the outputs of said network interface units, the inputs of said data stream control circuits, and the primary processing unit, and an output bus for interconnecting the outputs of said data stream control circuits, the inputs to said network interface units, and the primary processing unit.

12. The packet switching circuit of claim 11 wherein said interconnecting means further comprises a central processing unit bus interconnecting said data stream control circuits, said network interface units, and a central processing unit of said primary processing unit.

13. The packet switching circuit of claim 12 wherein said input and output bus means each comprises data lines and control lines.

14. A high speed data packet switching method for switching data packet stream among communication paths comprising the steps of receiving each packet stream from one of a plurality of networks, processing at least a first packet of each received data packet stream using a software controlled, primary processing unit, designating that performance of routine, repetitive header processing of the further packets of one of said received packet steams, said processing including packet forwarding processing to effect routing of said packet, receiving and examining by each said high speed hardware circuitry at least a portion of each packet of each said received data packet stream, determining based on said examination of said at least a portion of each packet by each of said high speed hardware circuitry, which said high speed hardware circuitry has been designated to process each further packet of each received data packet stream, receiving in said designated high speed hardware circuitry said each further packet.

15. The high speed data packet switching method of claim 4 further comprising the step of controlling at leat the initialization of a said high speed hardware circuitry assigned to process a packet stream from the software controlled, primary processing unit.

16. A high speed data packet switching method comprising the steps of receiving incoming packet streams from network interface units;

processing ones of the received data packets in response to a software controlled primary processing unit using a plurality of hardware data stream control circuits, interconnecting the primary processsing unit, the interface units, and the data stream control circuits for communications therebetween, processing at least a first one of the data packets from the receiving step for each new data packet stream in the primary processing unit, identifying, using the primary processing unit, one of the data stream control circuits for processing the incoming data packet stream, determining by each said data stream control circuit the one data stream control circuit which will process each packet of that portion of said incoming data packet stream which is not processed by said primary processing unit, processing that portion of a said data packet stream which is not processed by said primary processing unit by said identified data stream control circuit, and outputting the results of the data stream control circuit processing and the primary processing unit processing to form an output data stream for transmission along a communications path.

17. A high speed data packet switching circuit for receiving data packet streams from a plurality of input communication paths and for transmitting data packet streams to a plurality of output communication paths, said circuit comprising a plurality of network interface units for receiving the incoming data packet streams and for transmitting outgoing data packet streams, a software controlled primary processing unit, having a bus means, a central processing unit, a plurality of input storage units for receiving respectively each of said plurality of data streams from the network interface units and each input storage unit having its output connected to said bus means, means for connecting the central processing unit to said bus means, and a plurality of output storage units for receiving data from said central processing unit over said bus means, and for providing said data to said network interface units, a plurality of data stream control circuits for manipulating data packet stream in response to the primary processing unit, said data stream control circuits comprising a pattern matching circuit responsive to pattern setting signals from the central processing unit and to incoming streams of data packets from said network interface units for identifying a data packet to be processed by said control circuit, means for transferring identified data packets to said control circuit, a processor responsive control circuit for controlling, in response to control signals sent by the primary processing unit, means for congestion control, and means for header stripping and prepending functions for the data stream control circuit, and a data buffer responsive to said pattern matching circuit and the processor responsive control circuit for storing an incoming data packet stream from said control circuit and for outputting a stored data packet stream to be forwarded to a network interface unit, means for interconnecting said primary processing unit, said plurality of network interface units and said plurality of data stream control circuits, and said primary processing unit receiving from said network interface units at least a first one of the data packets of each new data packet stream and having means for designating those data packets of the stream which are not processing by the primary processing unit to be processed by a said data stream control circuit without further processing by said primary processing unit.

* * * * *